United States Patent

Pope

[11] Patent Number: 6,145,840
[45] Date of Patent: Nov. 14, 2000

[54] RADIAL FLOW SEALS FOR ROTATING SHAFTS WHICH DELIBERATELY INDUCE TURBULENT FLOW ALONG THE SEAL GAP

[75] Inventor: Adam Nelson Pope, Cincinnati, Ohio

[73] Assignee: Stein Seal Company, Kulpsville, Pa.

[21] Appl. No.: 08/459,460

[22] Filed: Jun. 2, 1995

[51] Int. Cl.[7] ............................................. F16J 15/34
[52] U.S. Cl. ......................... 277/348; 277/377; 277/387; 277/390; 277/400
[58] Field of Search ................................ 277/3, 27, 28, 277/53, 81 R, 96.1, 173; 415/170.1, 174.5, 229, 230

[56] References Cited

U.S. PATENT DOCUMENTS

| | | | |
|---|---|---|---|
| 3,499,653 | 3/1970 | Gardner | 277/96.1 |
| 3,623,736 | 11/1971 | Petrie et al. | 277/27 |
| 3,640,541 | 2/1972 | Taschenberg | 277/96.1 |
| 3,751,045 | 8/1973 | Lindeboom | 277/27 |
| 4,049,361 | 9/1977 | Chacour | 415/170.1 |
| 4,101,148 | 7/1978 | Lee | 277/3 |
| 4,687,346 | 8/1987 | Suciu | 277/85 |
| 5,137,284 | 8/1992 | Holder | 277/96.1 |
| 5,174,584 | 12/1992 | Lahrman | 277/96.1 |
| 5,180,173 | 1/1993 | Kimura et al. | 277/96.1 |
| 5,284,347 | 2/1994 | Pope | 277/53 |

FOREIGN PATENT DOCUMENTS 0470409  2/1992  European Pat. Off. .............. 277/96.1

*Primary Examiner*—Anthony Knight
*Assistant Examiner*—John L. Beres
*Attorney, Agent, or Firm*—Zigmund L. Dermer

[57] ABSTRACT

A face seal is provided for a rotating shaft for sealing between a normally high pressure region and a normally lower pressure region, having a seal ring shaped to form a gap between the ring and a runner surface on the shaft, which gap converges in the direction of fluid flow and deliberately creates turbulent flow along the seal gap and sufficient clearance between the rotating runner and the seal ring to accommodate distortions in the seal ring which may occur over its lifetime. A servo system is coupled to the seal ring which moves the seal ring away from the runner during low pressure differences between the regions and which restores the sealing function along the seal gap when the pressure difference between the regions increases sufficiently.

12 Claims, 4 Drawing Sheets

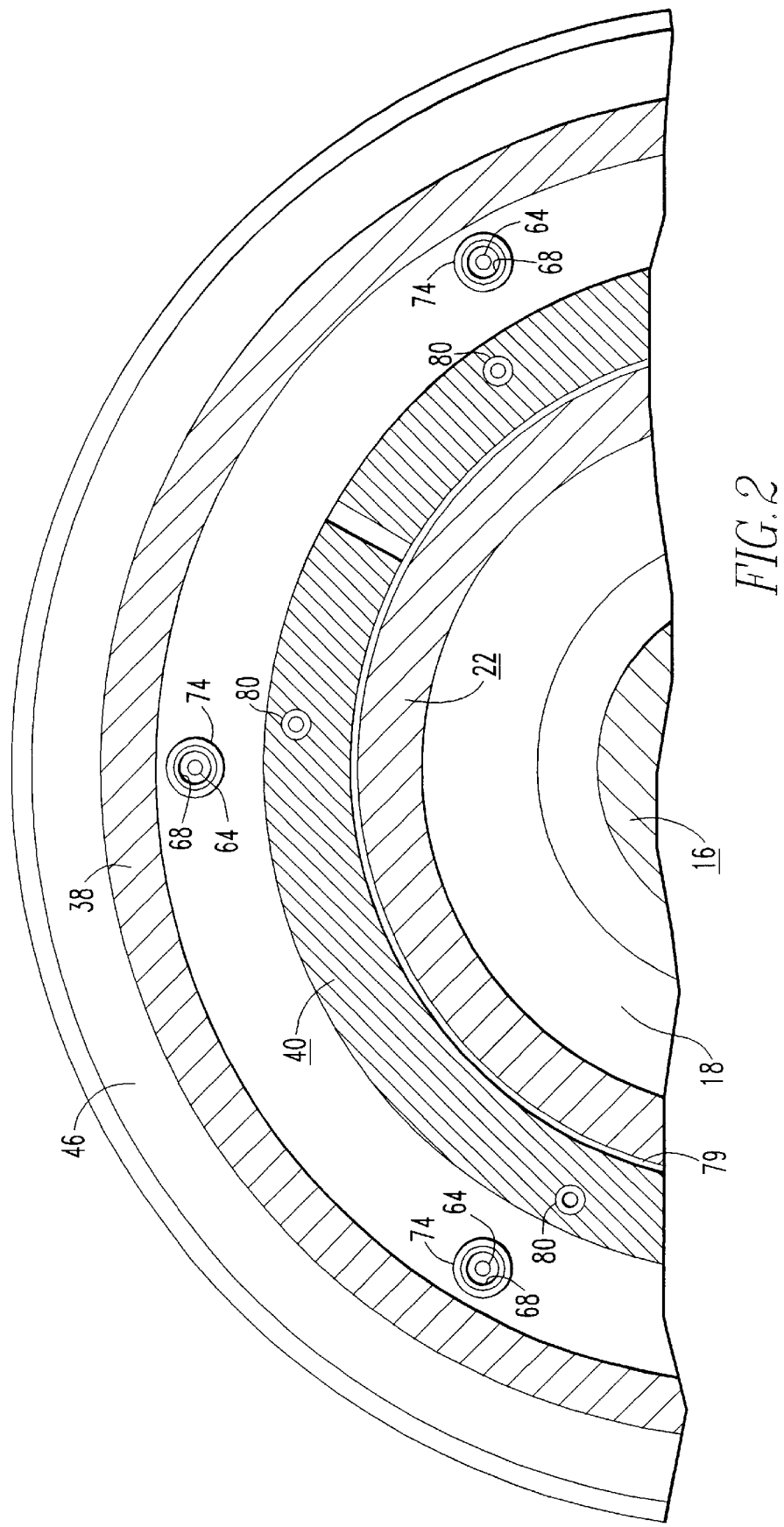

RADIAL FLOW SEALS FOR ROTATING SHAFTS WHICH DELIBERATELY INDUCE TURBULENT FLOW ALONG THE SEAL GAP

BACKGROUND OF THE INVENTION

1. Field of the Invention

The present invention relates to seals for rotating shafts to restrict fluid flow between rotating and stationary members; more particularly, it is related to a face seal which has improved sealing characteristics and which deliberately induces turbulent flow along the seal gap.

2. Description of the Known Art

The employment of seals along the rotating shaft for large machines such as gas turbines or steam turbines provides complex sealing problems. Such machines have traditionally utilized labyrinth type seals at critical sealing locations such as at the compressor discharge of a gas turbine or at the ends of a steam turbine shaft. Labyrinth type seals normally result in relatively high leakage, inasmuch as a labyrinth seal is usually designed such that for axial flow the radial clearance is 1 mil (0.001 inches) of clearance per inch of shaft diameter. Thus, for a 20 inch diameter shaft, 20 mils of clearance would normally be provided in a labyrinth seal. In gas turbines, 20 inch diameter shafts are not uncommon, whereas in certain steam turbines, 60 to 80 inch diameter shafts require sealing and a 60 to 80 mil clearance may well be provided. On the other hand, seals such as hydrostatic face seal assemblies are normally intentionally designed so that laminar flow occurs in the seal gap. Laminar flow is achieved by providing a converging flow path on the seal from a high pressure region in the machine toward a lower pressure region, with a face clearance on the order of 0.0005 inches (0.5 mil inches) and smaller. Seals with such minimal face clearances are difficult if not impossible to use in such applications, because such seals are essentially intolerant to distortions in geometry which can occur over a seal lifetime and during transient conditions where, for example, pressure and temperature differences may vary significantly. As a result, hydrostatic face seals have not been employed successfully for such applications. Seal designs such as the seal described in my U.S. Pat. No. 5,284,347, issued on Feb. 8, 1994, which had been proposed for such applications in such seal designs, include rather complex gas bearing faces in flow paths as well as complex centering means to attempt to minimize seal distortion. While not expressly discussed, such seals are not designed to deliberately provide turbulent flow in the seal gap.

SUMMARY OF THE INVENTION

It is the intention of this invention to permit the use of hydrostatic face seal assemblies in the aforementioned applications by providing a seal assembly which creates a sufficiently large gap or leakage path along the seal face to permit the seal to operate without damage due to ambient induced distortion of the seal assembly components. This is achieved by designing the seal so that turbulent flow rather than laminar flow is deliberately induced along the seal gap. Turbulent flow is provided for by selecting a predetermined seal geometry, particularly along the seal face, which creates a seal gap height of a minimum of 2 mils of clearance between the rotating seal runner and the closest part of the seal ring. Turbulent flow is induced in the seal gap by the provision of a convergent flow path, such as a step, or taper or combination of both, having a convergence in the axial direction of at least 1 milli-inch and preferably 2 milli-inches or more. In addition, for start-up and shut-down segments of the operating cycle of the seal, the seal assembly is provided with a servo mechanism which moves the critically machined seal and runner faces substantially away from one another during the low pressure segments of the operating cycle of the machine, as well as during expected and unexpected transients.

The present invention is useable not only with compressible fluids such as air, but also with incompressible fluids such as water or oil. It will be understood, however, that turbulent flow in the converging flow path from the high pressure edge to the lower pressure edge along the seal gap is deliberately induced for such medium, and turbulent flow is achieved when the Reynolds Number for the system is in excess of 1800. It will be remembered that the Reynolds Number varies inversely with the viscosity of the medium in which the seal is functioning; for a low viscosity fluid such as air, the step in the seal ring face, i.e., the convergence of the flow path along the seal gap is to be in excess of 1 mil (0.001 inches). For super-saturated steam in a steam turbine application, which acts in many respects the same as air, the viscosity of the medium is somewhat higher; therefore the step height is to be somewhat greater than 1 mil. For liquid media, the convergence of the seal gap is also in excess of 1 mil, because the viscosity of the liquid is significantly greater. Thus, to ensure that turbulent flow through the seal gap is being achieved, the geometry of this system, the temperature of the fluid, the viscosity of the fluid, the flow rate along the seal gap and the pressure drop (although to a smaller extent) are taken into consideration as each influences the Reynolds Number for the system. Thus, to employ this invention, the seal system is designed such that the Reynolds Number in the seal gap is in excess of 1800 so that turbulent flow along the seal gap is created. For a given gaseous system, in order to ensure a seal gap of sufficient axial height, the geometry should be such that the axial convergence of the seal ring face in the seal gap in the downstream direction is at least 2 mils.

BRIEF DESCRIPTION OF THE DRAWINGS

For a better understanding of this invention, reference may be had to the accompanying drawings in which:

FIG. 2 is a sectional view of the seal assembly of FIGS. 1A and 1B taken along the lines II—II of FIG. 1A.

DETAILED DESCRIPTION

Figure 1A:
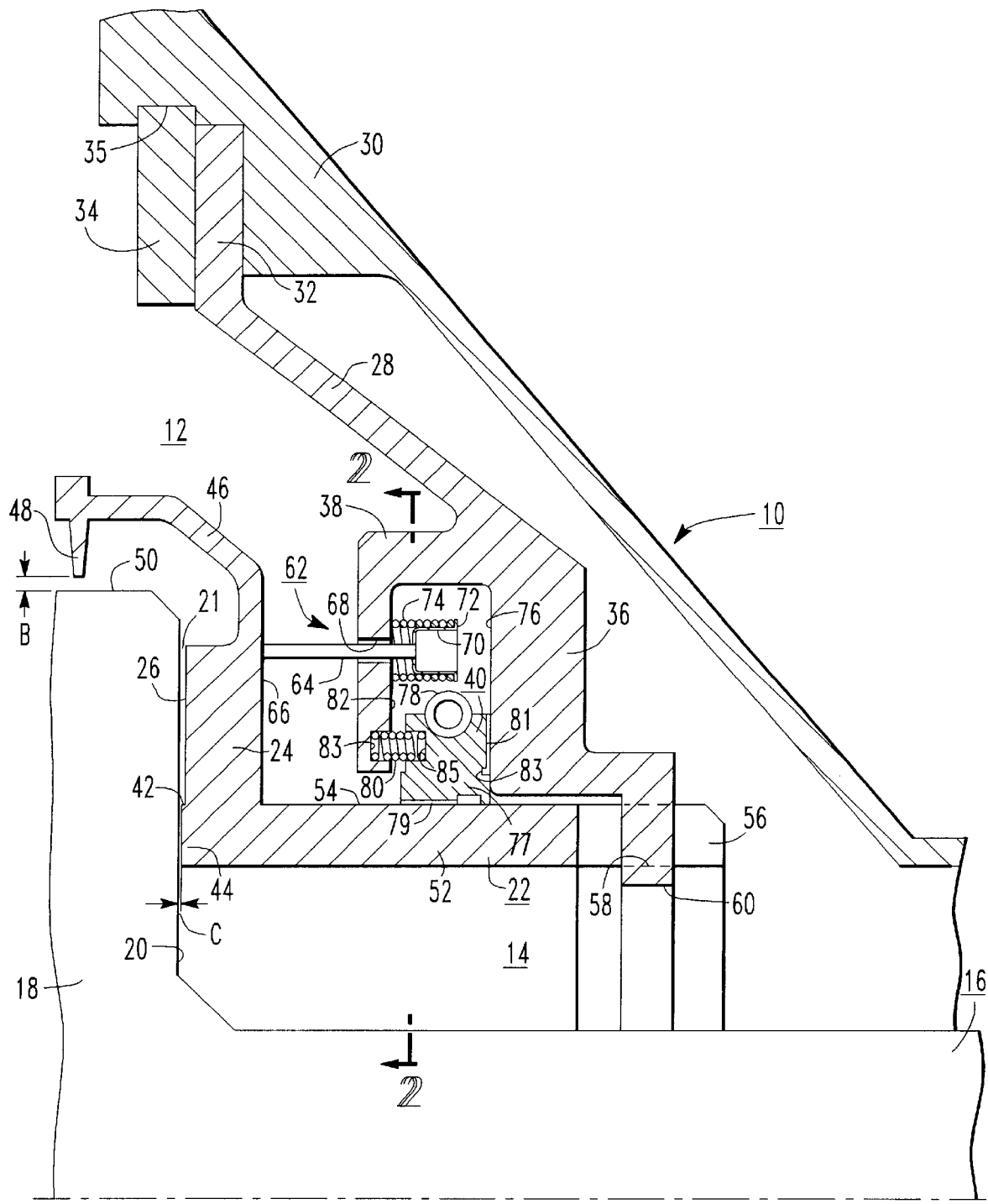
FIG. 1A is a sectional view of a housing having a rotating shaft therein and having a seal assembly constructed in accordance with the principles of this invention, sealing between a low pressure region and a high pressure region of the housing, with the seal assembly being illustrated in its normal operating position.
Figure 1B:
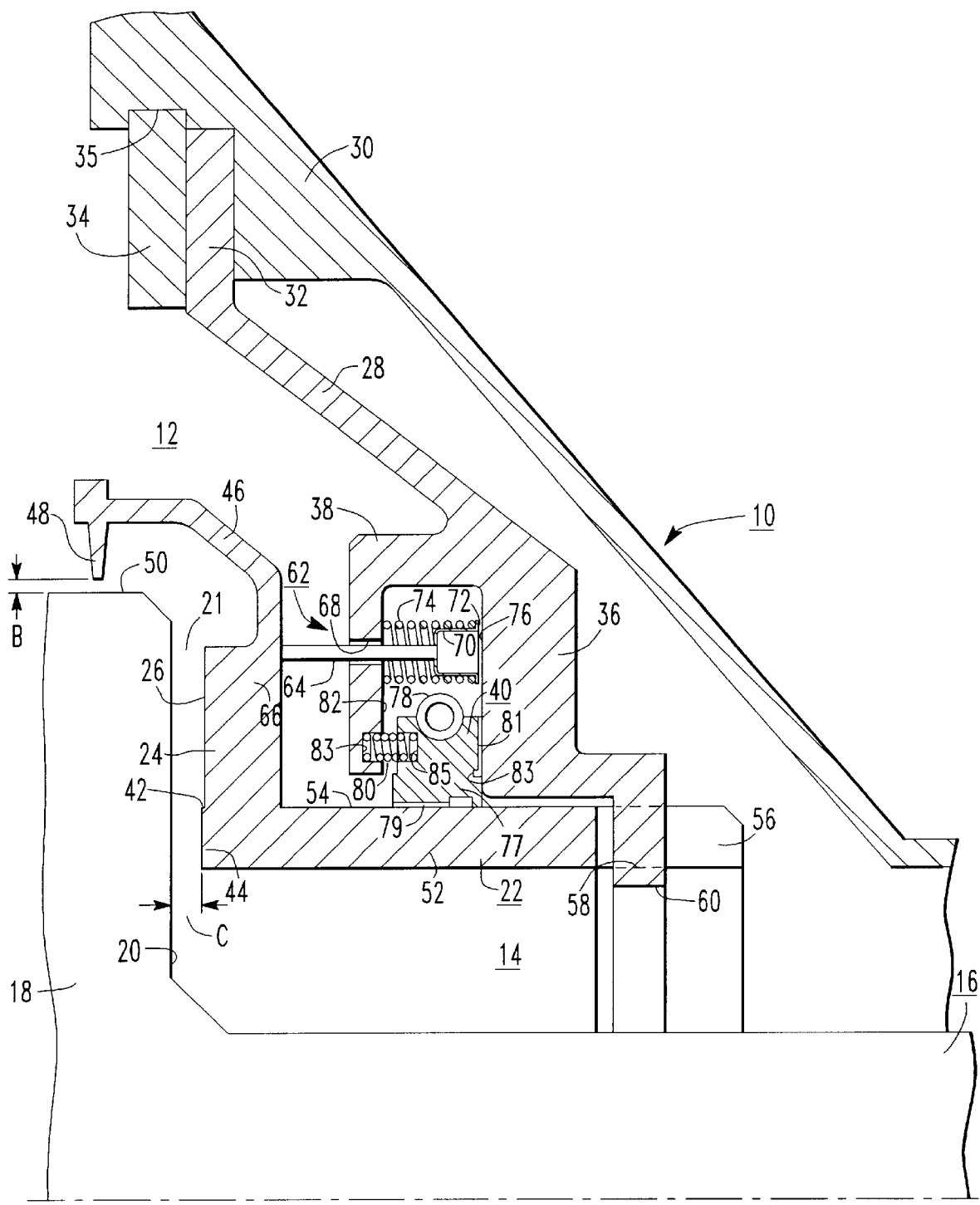
FIG. 1B is a view similar to FIG. 1A wherein the seal assembly is depicted in its open or retracted position.

Referring now to the embodiment of this invention illustrated in FIGS. 1A, 1B and 2, there is illustrated a section of a housing 10, for example, the portion of the housing 10 of a gas turbine, downstream of the compressor unit exit, having a high pressure chamber 12 therein and a lower pressure chamber 14. An elongated shaft 16 having a horizontal axis is adapted to rotate at relatively high speed within the housing 10. The shaft 16 has formed either integrally therewith, as illustrated herein (or as attached thereto by means, not shown, which are well known in the art), a radially extending annular seal runner 18 which extends laterally from the axis of the shaft 16. Seal runner 18 has a radially extending, precisely machined, sealing surface 20 of annular configuration formed thereon. The low pressure region 14 within housing 10 is illustrated to be adjacent to rotating shaft 16, while the high pressure region 12 is located more outwardly of the outer edge of seal runner 18.

Interposed between high pressure region 12 and low pressure region 14 of housing 10 is a seal ring assembly 22 receiving a portion of shaft 16 thereon and positioned to move axially along shaft 16 toward and away from the radial sealing surface 20 of seal runner 18. As will be described in detail hereinafter, fluid flow from the high pressure chamber 12 to the low pressure region 14 within housing 10 is prevented by the seal ring assembly 22 cooperating with other components within housing 10, except along primary seal gap 21 between seal ring assembly 22 and runner sealing surface 20. The seal ring assembly 22 includes an annular seal ring 24 of generally L-shaped cross section which moves toward and away from surface 20 of seal runner 18 to vary the size of seal gap 21.

Housing portion 10 includes a thickened housing segment 30 disposed adjacent the outer periphery of housing portion 10 and includes therewithin a stationary frame assembly 28 extending toward shaft 16 which serves to mount the seal ring assembly 22 within housing 10. Frame assembly 28 is of generally annular configuration and includes an annular foot 32 which is positioned to be received in thickened portion 30 and is sealingly secured thereto by suitable means, e.g., an annular retaining ring such as snap ring 34 which is mounted in a complementary recess 35 in thickened portion 30. The frame 28 includes a central hub assembly 36 of generally annular configuration located closer to shaft 16 than foot 32. The central hub 36 has a seal mounting extension 38 of generally L-shaped cross section on which the seal ring assembly 22 is mounted and which serves to accommodate a secondary seal ring 40, to be described. Central hub 36 is disposed at generally the same radial location relative to shaft 16 as the runner 18 and is positioned to the right thereof in the axial direction as illustrated in FIGS. 1A and 1B so that the hub 36 and seal mounting extension 38 are positioned generally opposite the radial runner sealing surface 20. The seal ring 24 moves axially toward and away from the runner 18 between the hub 36 and runner 18. The seal ring 24 is desirably a circumferentially continuous structure and has a radially extending ring-shaped sealing surface 26 thereon which is precisely machined and lapped and confronts the sealing surface 20 on seal runner 18 creating the primary seal gap 21 therebetween. In this embodiment of the invention, the ring sealing surface 26 is of a flat configuration in the radial direction, and the convergence of seal gap 21 is achieved by a step 42 extending toward runner surface 20 to form a sealing dam 44 on ring 24 adjacent shaft 16. The size of the step 42 is critical to this invention, as it must create a geometry which produces turbulent flow in the seal gap, thereby producing sufficient clearance between the seal ring and seal runner to make a face seal assembly practical for applications and environments described herein.

Extending from the outer periphery of the seal ring 24 is an arcuate support arm 46 of continuous, annular configuration which extends to overlie a portion of the outermost surface 50 of the seal runner 18 and a ring-shaped, continuous, auxiliary restrictive tooth 48 of predetermined size extends from the support arm 46 toward the axial outer surface 50 on the seal runner 18 with the spacing B between the tooth 48 and surface 50 also being important to the operation of the seal assembly 22. Extending in the axial direction away from seal runner 18 and from the inner end of the base of the L-shaped seal ring 24 is an annular extension 52, having a sealing surface 54 formed on the outer axial surface thereof to cooperate with secondary seal ring 40 to provide a bore seal along surface 54. Annular extension 54 terminates in a plurality of alignment arms 56 which extend axially outwardly from the right-hand edge thereof (FIGS. 1A and 1B) and coact with openings or slots 58 formed in a downwardly extending arm 60 in the hub 36 to align the seal ring assembly 24 relative to the hub 36 and the seal runner 18. It will be appreciated that the alignment arms 56 are closely received within openings 58 in the hub arm 60 and further that a plurality of alignment arms are provided circumferentially spaced along the periphery of the seal ring extension 52 so as to support and center adequately the seal ring assembly 24 relative to the shaft 16 and runner 18.

A servo mechanism assembly identified generally by the reference character 62 is interposed between seal ring 24 and the seal mounting extension 38 as will be described. More particularly, a plurality of shafts such as the shaft 64 extend axially from the rear surface 66 of the seal ring 24 toward the seal mounting extension 38 and through aligned openings such as opening 68 therein. Shaft 64 extends entirely through mounting extension 38 and terminates in the annular space between mounting extension 38 and hub 36. A cup-shaped member 70 having an outwardly extending flange 72 on the end thereof remote from opening 68 is secured to the right-hand end of the shaft 64. Interposed between the flange 72 and the mounting extension 38 for each shaft 64 is a coiled spring 74 which urges the seal ring 24 away from runner 18 and toward the central hub 36.

In order to ensure that fluid flow from higher pressure chamber 12 to lower pressure chamber 14 passes only along the seal gap 21, the secondary seal means such as assembly 40 is interposed to provide not only a bore seal between the outward circumferential surface 54 of the seal ring extension 52, but also a face seal between the surface 76 on the central hub 36 and the opposed radial surface on secondary seal 40. It will be seen that the surface 76 is disposed in opposition to (i.e., facing) sealing surface 20 on runner 18. The secondary or bore seal on surface 54 is in alignment with the step 42 so that surface 54 forms the balance diameter of seal ring assembly 22. Secondary seal assembly 40 may comprise one of many known seal arrangements such as a piston ring or a segmented annular seal ring. Alternatively, an annular bellows seal may be interposed directly between seal ring 24 and hub surface 76 to achieve the sealing function.

Illustrated in FIGS. 1A, 1B and 2 is a segmented annular seal ring with only one of the segments 77 being shown. For a more detailed understanding of the secondary seal ring 40 illustrated in FIGS. 1 and 2, reference may be had to Stein U.S. Pat. No. 4,082,296, issued on Apr. 4, 1978, and assigned to Stein Seal Company, which is incorporated herein by reference. Of course, the seal of U.S. Pat. No. 4,082,296 would not employ its negative hydrodynamic lift feature since it is being used with non-rotating parts, but is otherwise usable as an example of a secondary seal. The secondary seal assembly 40 is designed to complement the application in which the primary seal assembly 22 is being employed; thus, for a gas face seal, a different secondary seal may be employed from an application wherein the seal assembly 22 and secondary seal 40 are in a liquid medium. As pointed out, the secondary seal assembly does not form a part of this invention other than to ensure that a secondary sealing function occurs. Thus, as an example, employing the seal ring of FIGS. 1 through 4 of Stein U.S. Pat. No. 4,082,296 for the secondary seal assembly 40, it will be seen that a garter spring 78 urges the seal ring segments 77, only one of which is illustrated, into engagement with the sealing surface 54 on seal ring extension 52 to provide the bore seal. At the same time, a plurality of symmetrically-spaced axial coiled springs, one of which is coil spring 80, are interposed between the seal ring segments 77 and the opposing face 82 on seal support 38 to move the segments 77 toward face 76 to form a face seal. Coil springs 80 are received in opposed recesses 83 and 85 formed respectively in mounting extension 38 and segments 77 to position springs 80. Axially-extending spaced recesses 79 are formed in the seal ring segment 77, creating wear pads for the bore seal, and radial recesses 81 are formed in the radial outer sealing surface which join a circumferential groove 83 of segment 77 to prevent binding of this segment 77 to face 76 of hub 36.

NORMAL OPERATION

It will be seen that the high pressure from chamber 12 exerts a closing force on the back face 66 of the seal ring 24 when a high pressure difference exists between region 12 and region 14, urging the seal ring 24 toward the sealing surface 20 on seal runner 18. This movement is resisted by the force of the several coil springs 74 which are urging the seal ring 24 away from runner 18. The opposing force of springs 74 is overcome by the high pressure, and seal ring 24 moves toward runner surfaces to close seal gap 21. Seal ring extension 52 concurrently moves axially with respect to shaft 16, and surface 54 slides relative to the secondary seal assembly 40 to maintain the secondary bore seal and face seal. The size of the gap B between restrictor tooth 48 and end surface 50 of runner 18 is, during normal operation of the seal, significantly larger than the seal gap 21 between sealing dam 44 and circumferential surface 20 on runner 18. The dimension C of the seal gap 21 is determined by the axial position of the nose of seal dam 44 relative to the runner surface 20. Thus, during normal operation of the seal, high pressure from chamber 12 is exerted on the back surface 66 of the seal ring 24 urging the seal ring toward the runner 18, and the high pressure is prevented from moving from chamber 12 to lower pressure region 14 by secondary seal 40 except through the space B between restricted tooth 48 and surface 50 and the opposed seal gap 21. The convergence of the seal ring sealing surface 20 is formed in the example of FIGS. 1 and 2 by step 42 to create a converging flow path in the direction of fluid flow from the outer edge of surface 20 to the inner edge thereof. The degree of convergence, in this example, the height of step 42, is deliberately in excess of 0.001 inches (1 mil), thereby creating a Reynolds Number for the system in excess of 1800 so that turbulent flow is induced along the seal gap 21. In this way, the clearance C between the seal dam 44 and the runner surface 20 is thus created to be, in this example, on the order of 2 milli-inches in height so as to provide a greater clearance than that which would be achieved by designing a seal system having only laminar flow through the seal gap 21. It is to be understood that the seal ring 24 is formed with a geometry such that a converging flow path is provided either by a step, a taper in the direction of the fluid flow to narrow the gap, or a combination of step and taper. In this example, the degree of convergence of the surface 26 on the seal is sized to be about the same as the spacing during normal operation between the seal ring dam 44 and seal runner surface 20.

With the seal being designed having converging surfaces of a geometry which creates a deliberate turbulent flow region along the seal gap, the seal will operate with sufficient clearances to minimize seal wear in the event of thermal distortion, vibration and the like, to which the seal ring assembly 22 is subjected during operation and during transients. This permits the provision of a sealing assembly of high reliability and long life with relatively low leakage when compared to other sealing systems employed for these applications. Of course, seals constructed in accordance with this invention will have greater leakage rates than seals which have a geometry permitting only laminar flow, but the latter seals will be unreliable and/or have shorter operating lifetimes for many important sealing applications.

TRANSIENT OPERATION

During transient operations such as start-up of a gas or steam turbine, before high pressure is created in the chamber 12, it will be seen that there is an absence of high pressure which would urge surface 66 of seal ring 24 toward runner 18. Thus, the seal ring assembly 22 is moved to the right of the seal runner 18 and axially parallel to the axis of shaft 16 to the position illustrated in FIG. 1B, due to the influences of the several coil springs 74 which react between flange 72 and the mounting extension 38. While the seal assembly is in the position illustrated in FIG. 1B, as pressure in chamber 12 increases, the flow from chamber 12 to chamber 14 is limited by the clearance B between the aspirator tooth 48 and surface 50 on runner 18, whereby a pressure drop is created between chambers 12 and 14 but of significantly smaller magnitude than that during normal operation of the seal assembly 22. As pressure in chamber 12 increases, the aspirator tooth 48 causes pressure in the seal gap 21 to be lower than the pressure being exerted by the fluid in chamber 12 on the back surface 66 of seal ring 24, and the higher pressure in surface 66 urges the seal ring 24 toward the runner 18 in opposition to the spring forces created by springs 74. Pressure continuing to build up moves seal ring 24 closer to surface 20 until the seal gap C between the seal ring dam 44 and runner 18 becomes smaller than the restrictor tooth gap B between tooth 48 and runner surface 50. Seal ring assembly 22 slides toward the runner 18 against the forces of springs 74 and against frictional forces created by the bore seal of secondary seal ring 40 on surface 54, and turbulent flow in the seal gap 21 begins. The seal assembly 22 remains centered by the alignment arm 56 being closely received within opening 58 in leg 60 of the central hub 36, and normal operation of the seal is achieved where pressure increases in chamber 12 are accommodated by the seal gap C to essentially maintain the pressure difference between chambers 12 and 14.

In the event of a sudden large drop in pressure in chamber 12, the forces on surface 66 are overcome by the spring forces 74 moving the seal ring assembly 22 away from runner 18 and increasing the seal gap C to a point where it becomes larger than the restrictor tooth gap B, and the seal assembly moves toward the position illustrated in FIG. 1B.

Figure 3:
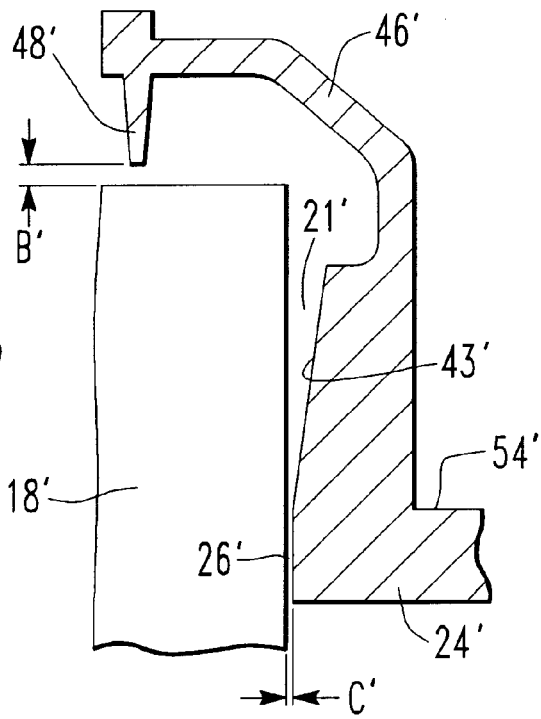
FIG. 3 is a fragmentary view of a seal ring and seal runner arrangement illustrating an alternative geometry of the seal ring face.
Figure 4:
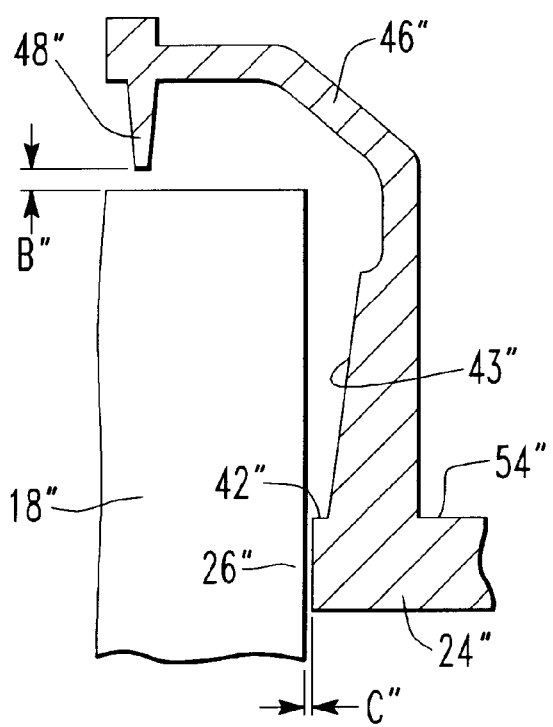
FIG. 4 is a view similar to FIG. 3 showing still another alternate geometry of the seal ring face.

Referring now to the embodiments of this invention illustrated in FIGS. 3 and 4, there is shown in each of these figures a fragmentary view of a portion of the seal runner 18 and a seal ring 24, it being understood that other parts of the assembly of FIGS. 1A, 1B and 2 remain the same. Thus in FIG. 3, the seal runner 18' and seal ring 24' are illustrated with an auxiliary restricted tooth 48' being secured to seal ring 24 by an arcuate annular support arm 46' so that the tooth 48' is positioned opposite the outer surface 50' of runner 18' and size to form a gap B' of predetermined size therebetween. In the FIG. 3 embodiment, rather than employing a step such as the step 42 of FIGS. 1 and 2, the seal ring surface 26' has a flat portion on the facing surface of the seal dam 44' and an outwardly tapered portion extending from a point in axial alignment with surface 54' (the balance diameter of the ring 24') inwardly of the seal ring 24' toward the outer edge of the ring surface 26'. The degree of taper is sized so that a converging flow path in the direction of fluid flow, i.e., radially inwardly in the direction of flow toward shaft 16, is provided with the taper being shaped to deliberately create turbulent flow along the seal gap 21' between ring 24' and runner 18'. The extent of the taper, i.e., the total divergence of the tapered section, is at least 1 milli-inch and preferably 2 milli-inches or more, and the seal is designed so that a gap between surface 26' and surface 20' of at least 2 milli-inches is created. It will be seen that the manufacture of seal ring 24' and in particular the sealing surfaces 26' and the tapered portion, is easier to carry out than the manufacture of a seal ring having a step of at least 1 milli-inch; therefore, the cost of manufacture of a seal ring 24' of FIG. 3 will be somewhat less than that of the seal rings including a step.

In the embodiment of FIG. 4, it will be seen that seal runner 18" and seal ring 24" are provided, together with continuous, annular support arm 46", which supports annular, continuous restrictor tooth 48" disposed outwardly of runner outer surface 50" in runner 18 to form gap B". In this embodiment, however, the converging flow path between seal ring 24" and seal runner 18" is created by a combination of a step 42" and a tapered section 43".

The alternate converging flow path seal ring may be employed in order to fit the seal ring constructed in accordance with this invention to given system parameters so that the turbulent flow along the seal gap is ensured.

It will be further appreciated by those skilled in the art that the specific embodiments of this invention described with particularity herein may be varied without departing from the broad spirit and scope of this invention. Accordingly, it is specifically intended that the embodiments of this invention be interpreted as illustrative thereof rather than as limitive thereof.

What is claimed is:

1. A hydrostatic seal assembly used to restrict the flow of fluid from a relatively higher pressure region in a housing to a relatively lower pressure region in the housing at a juncture of a stationary housing member and a rotating shaft member rotating about its axis, said shaft having a sealing surface thereon, said assembly comprising:
    (a) a non-rotating seal ring member mounted around said shaft and having a primary annular sealing face surface positioned for movement toward and away from said shaft sealing surface and forming a seal gap therebetween to break down the pressure across the seal ring member, said seal ring member sealing face surface having a first and a second edge thereon, said first edge of said seal ring sealing face surface being exposed to the higher pressure region in said housing and said second edge of said seal ring sealing face surface being exposed to the lower pressure region,
    (b) said seal ring sealing face surface being formed to converge toward said shaft sealing surface along the gap in the direction from said first edge of said seal ring sealing surface toward the second edge thereof to provide a converging flow path in said seal gap from said first edge toward said second edge and forming only a single sealing dam adjacent said second edge, said seal ring sealing face surface being intentionally formed with a geometry that converges toward said shaft seal surface a distance sufficient to deliberately create, when the higher pressure region is pressurized, a Reynolds number for the fluid in the seal gap of more than 1800, thus providing turbulent fluid flow within and along said seal gap, whereby a larger clearance between said seal ring sealing face surface and said shaft sealing surface is thus created than would exist for laminar flow along said seal gap.

2. The seal assembly of claim 1 wherein the sealing dam of said seal ring sealing face surface is formed at least in part by a step on said seal ring sealing face surface extending toward said shaft surface such that the height of the convergence in said gap is at least one milli-inch, said step facing said first edge of said seal ring sealing face surface.

3. A hydrostatic face seal assembly used to restrict the flow of fluid from a relatively higher pressure region in a housing to a relatively lower pressure region in the housing at a juncture of a stationary housing member and a rotating shaft member rotating about its axis, said shaft having a radially extending annular seal runner having a radially extending sealing surface thereon, said runner mounted for rotation therewith, said assembly comprising:
    (a) a face seal ring member mounted around said shaft and having a radially extending primary annular sealing face surface positioned for movement axially relative to said shaft and toward and away from said seal runner surface and forming a seal gap therebetween to break down the pressure radially across the seal ring member, said seal ring member sealing face surface having an inner and an outer edge thereon, one of said inner and outer edges of said sealing face surface being exposed to the higher pressure region in said housing and the other of said inner and outer edges of said sealing face surface being exposed to the lower pressure region,
    (b) said sealing face surface being formed to converge toward said seal runner surface along the gap in the direction from said one edge of said sealing face surface toward said other edge thereof to provide a converging flow path in said seal gap in the radial direction from said one edge toward said other edge, and forming only a single sealing dam in said seal gap, said sealing face surface being intentionally formed with a geometry that converges sufficiently to deliberately create turbulent fluid flow and to have a Reynolds number in excess of 1800 within and along said seal gap, whereby a larger clearance between said sealing face surface and said seal runner surface is thus created than would exist for laminar flow along said seal gap.

4. The hydrostatic face seal assembly of claim 3, wherein said converging flow path along said seal gap is formed at least in part by a step in said sealing face surface extending toward said seal runner, said step facing said one edge of said seal ring member and being more than 1 milli-inch in height.

5. The hydrostatic face seal assembly of claim 3, having resilient means extending between the housing and the seal ring member which are biased to move the seal ring member away from the seal runner surface to open the seal gap, and means on said seal ring member to move the seal ring member toward the seal runner surface when sufficient pressure difference exists between the higher pressure region and the lower pressure region to reduce the size of the seal gap.

6. A fluid seal assembly comprising a rotatable shaft having a radially extending runner with a radially extending runner surface thereon, a housing receiving said shaft and having walls thereon defining a pressure chamber therein, a seal ring having a pair of opposed radial surfaces thereon, said ring receiving said shaft in the opening thereof and mounted in said housing in axial floating relationship with said runner surface, one of said seal ring radial surfaces being exposed during operation of said assembly to the pressure in said chamber, the other of said seal ring radial surfaces confronting said runner surface and being spaced therefrom when said chamber is pressurized to form a seal gap therebetween, said other of said seal ring surfaces having one extremity thereof exposed to said pressure chamber and the other extremity exposed to a relatively low pressure region in said housing, said other seal ring surface being shaped to provide radial convergence of said seal gap in the radial direction from said one extremity toward said other extremity and forming only a single sealing dam therein adjacent said other extremity, said other seal ring surface being shaped to provide said convergence of at least 1 milli-inch in height toward said runner surface with the widest portion of said seal gap being adjacent said one extremity to deliberately create turbulent flow of fluid in said seal gap, and, when said chamber is pressurized, the spacing at the narrowest height of said seal gap is deliberately greater than the spacing that would exist for laminar flow along said seal gap, and additional sealing means interacting between said seal ring and said housing to prevent flow from said pressure chamber to said low pressure region except along said seal gap.

7. The fluid seal assembly of claim 6, wherein said seal ring has an elongated annular extension thereon concentric with said shaft which extends outwardly from said one of said seal ring radial surfaces and receiving said shaft therein, and said additional seal means coacting between said extension and said housing.

8. The fluid seal assembly of claim 7, wherein said housing has a plurality of circumferentially spaced openings therein symmetrically disposed about said shaft, and said seal ring extension having a plurality of alignment means extending from the outer end of said extension and slidably received in said openings, respectively, to maintain said seal ring in axial alignment with said shaft and said runner surface.

9. The fluid seal assembly of claim 6 wherein said assembly has an annular restrictor tooth located closely adjacent said runner and positioned upstream of said one extremity of said other of said seal ring surfaces, said restrictor tooth being spaced from said runner at predetermined distance which distance is greater than the widest height of the seal gap during normal pressurized operation of said seal ring, said restrictor tooth being mounted such that its spacing form the runner does not vary even when pressure in said pressure chamber is eliminated, and means connecting said restrictor tooth and said seal ring to prevent flow into said seal gap except through the said spacing between said restrictor tooth and said runner.

10. The fluid seal assembly of claim 9 having resilient means coacting between said seal ring and said housing and urging said other seal ring surface away from said runner surface, whereby said resilient means and said restrictor tooth cooperate to form a servo mechanism to open said seal gap when pressure in said pressure chamber is significantly reduced and to move said seal ring toward said runner surface to restore said seal gap without causing frictional engagement of said seal ring and said runner when the pressure in said pressure chamber is increased significantly.

11. The fluid seal assembly of claim 6 having a servo mechanism cooperating with said seal ring which opens the gap between said other seal ring surface and said runner surface when pressure in said pressure chamber is significantly reduced and which moves the said seal ring closer to said runner surface without causing frictional engagement of said seal ring and said runner, in response to a return of pressure to said pressure chamber.

12. The fluid seal assembly of claim 11 wherein said resilient means comprises a plurality of springs symmetrically spaced about said seal ring.

* * * * *